United States Patent
Sherman

(10) Patent No.: US 6,873,459 B2
(45) Date of Patent: Mar. 29, 2005

(54) IMAGE TRANSFERRING APPARATUS

(75) Inventor: Joseph Sherman, Sherman Oaks, CA (US)

(73) Assignee: Overbreak, LLC, Sun Valley, CA (US)

(*) Notice: Subject to any disclaimer, the term of this patent is extended or adjusted under 35 U.S.C. 154(b) by 117 days.

(21) Appl. No.: 10/211,216

(22) Filed: Aug. 2, 2002

(65) Prior Publication Data

US 2004/0027661 A1 Feb. 12, 2004

(51) Int. Cl.[7] .......................... G03B 21/56; G02B 27/14; G09E 7/00; E05D 7/10
(52) U.S. Cl. .......................... 359/447; 359/635; 40/492; 16/266
(58) Field of Search .............................. 359/447, 635; 40/490, 492; 16/225, 266, 267

(56) References Cited

U.S. PATENT DOCUMENTS

| | | | |
|---|---|---|---|
| 1,029,248 A | 6/1912 | Williams | 359/635 |
| 1,420,491 A * | 6/1922 | Morse | 359/635 |
| 1,518,680 A | 12/1924 | Arnot | 359/872 |
| 1,946,837 A | 2/1934 | Clayton | 16/330 |
| 2,505,116 A | 4/1950 | Hitchings | 40/390 |
| 3,274,715 A | 9/1966 | Janssen | 40/390 |
| 3,291,552 A * | 12/1966 | Hoggan | 359/635 |
| 3,693,580 A | 9/1972 | Thierer | |
| 3,819,251 A | 6/1974 | Hoggan | 350/121 |
| 4,191,450 A | 3/1980 | Hoggan | 350/121 |
| 4,670,076 A | 6/1987 | Davies | 156/244.11 |
| 4,865,547 A | 9/1989 | Glover | 434/85 |
| 4,946,254 A | 8/1990 | Tauer | 350/174 |
| 4,953,859 A | 9/1990 | West | 273/1 |
| 4,997,206 A * | 3/1991 | Hong | 16/266 |
| 5,388,530 A | 2/1995 | Jacobus | 08/43 |
| 5,751,477 A * | 5/1998 | Tomita et al. | 359/447 |
| 5,785,528 A | 7/1998 | Jones-Fenleigh | 434/88 |
| 5,989,033 A | 11/1999 | Burgio | 434/88 |

* cited by examiner

Primary Examiner—Christopher Mahoney
(74) Attorney, Agent, or Firm—Blakely, Sokoloff, Taylor & Zafman, LLP

(57) ABSTRACT

An image transferring device is disclosed having a support plate, a reflective plate and a core member adapted to support the support plate and reflective plate thereon. The core member includes an operative position stop member and a storage position stop member for each of the support plate and reflective plate. The support and reflective plates are angularly rotatably about the core member and each plate's angular rotation is restricted between the operative position stop member and the storage position stop member. In an operating configuration, the support plate is automatically positioned at a specified angle with respect to the reflective plate. In a storage configuration, the plates fold toward each other for easy storage.

18 Claims, 4 Drawing Sheets

IMAGE TRANSFERRING APPARATUS

FIELD OF THE INVENTION

The present invention relates generally to an apparatus for projecting an image on a surface for tracing.

BACKGROUND OF THE INVENTION

Image transferring devices have been available to facilitate the tracing of an image by reflecting the image onto a drawing surface. In known devices, an image support card and an image-producing card are positioned at a selected angle with respect to each other to optimize the reflection of the image from the image support card onto the image-producing card.

Several types of support mechanism have been suggested for positioning the image support card at the selected angle with respect to the image-producing card. In one known device, a double-clip member is used having a fixed angle between a first clip and a second clip. The first clip is adapted to hold the image support card and the second clip is adapted to hold the image-producing card. To adjust the angle between the image support card and the image-producing card, an adjustment wedge is inserted between the first and second clips. The adjustment wedge has means for adjusting the position of the wedge against the clips, such that the angle between the first and second clips can be increased or decreased as desired.

A disadvantage of the known double clip construction is that the image support card and the image-producing card protrude a substantial distance from the base plate. When the device is stowed away during non-use, the image support card and image-producing card must be removed from the clips as a practical matter. When the transferring device is used once again, the image support card and image-producing cards must again be attached to the clips. It would be desirable to provide a mechanism that holds the image-producing card and image support card in position, and yet is not so bulky as to require removal of the cards each time the device is stored.

In another known device, a hinged arrangement provides a plurality of floating knuckles for holding the cards with respect to each other when the transferring device is not in use. The floating knuckles have corresponding convex and concave portions that engage each other to position the cards at various selected angles. The convex and concave portions are preferably biased toward each other by a coil spring. A disadvantage of the known device is that the hinge mechanism is complex and requires several additional components which complicates manufacture of the device, and thus adds to its cost. Accordingly, it is desirable to provide a device having a simple design, with less components, that is easy to manufacture.

Another disadvantage of known image transferring devices is that the image support card and image-producing card must be manually positioned at the appropriate angle to optimize the reflective feature of the device. Thus, the user must manipulate the cards until the optimal reflective angle is found. It would be desirable to provide a device that automatically positions the image-producing card and the image support card at the optimal reflective angle with respect to each other.

SUMMARY OF THE INVENTION

An image transferring device is disclosed having a support plate, a reflective plate and a core member adapted to support the support plate and reflective plate thereon. The core member includes an operative position stop member and a storage position stop member for each of the support plate and reflective plate. The support and reflective plates are angularly rotatably about the core member and each plate's angular rotation is restricted between the operative position stop member and the storage position stop member.

In another embodiment of the invention, the core member preferably includes a first plate holder with a first receiving channel therein dimensioned to receive the spine of the reflective plate and a second plate holder having a second receiving channel therein dimensioned to receive the spine of the support plate. The reflective plate and support plate are rotatable within the respective channels.

The support plate spine and reflective plate spine preferably have an arcuate shape and more preferably are bulbous, to facilitate the rotation of the spines within the respective plate receiving channels. The channels preferably have a shape corresponding to the shape of the spines.

In a preferred embodiment of the invention, the first and second plate holders are V-shaped cut-outs in the core member, and each of the plate holders have a limiting surface at one end of the holder. The plate holders are configured such that when the reflective plate abuts the limiting surface of the first plate holder and the support plate abuts the limiting surface of the second plate holder, the reflective plate will be positioned at a selected angle with respect to the support plate. The preferred angle between the reflective plate and the support plate is about 60 degrees. Upon opening of the image transferring device, the support plate and the reflective plate will automatically move toward the respective limiting surfaces and will be positioned 60 degrees from each other.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE INVENTION

Figure 1:
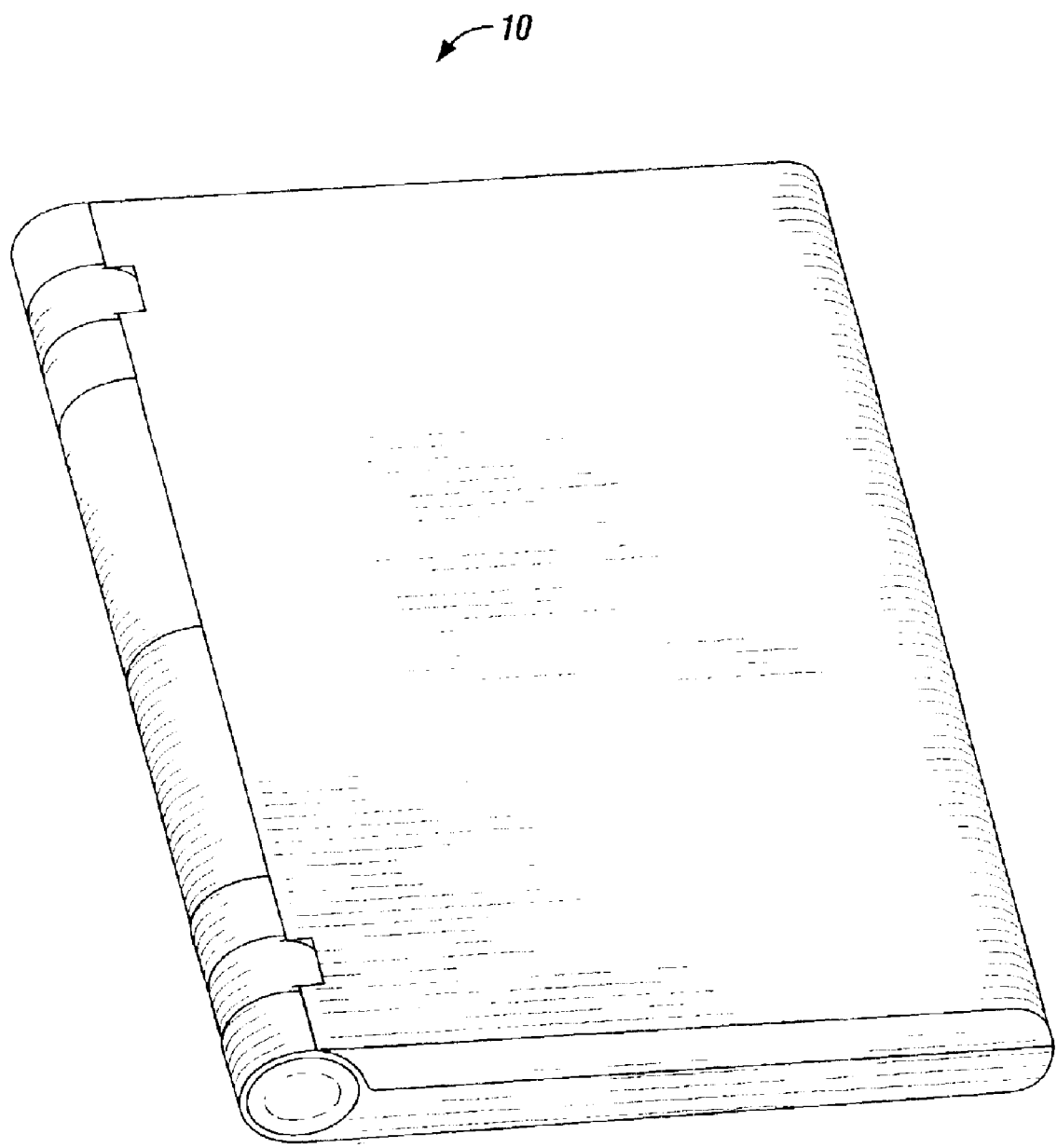
FIG. 1 is a perspective view of a preferred embodiment of the transferring device of the present invention with the support and reflective plates folded in a closed position.
Figure 2:
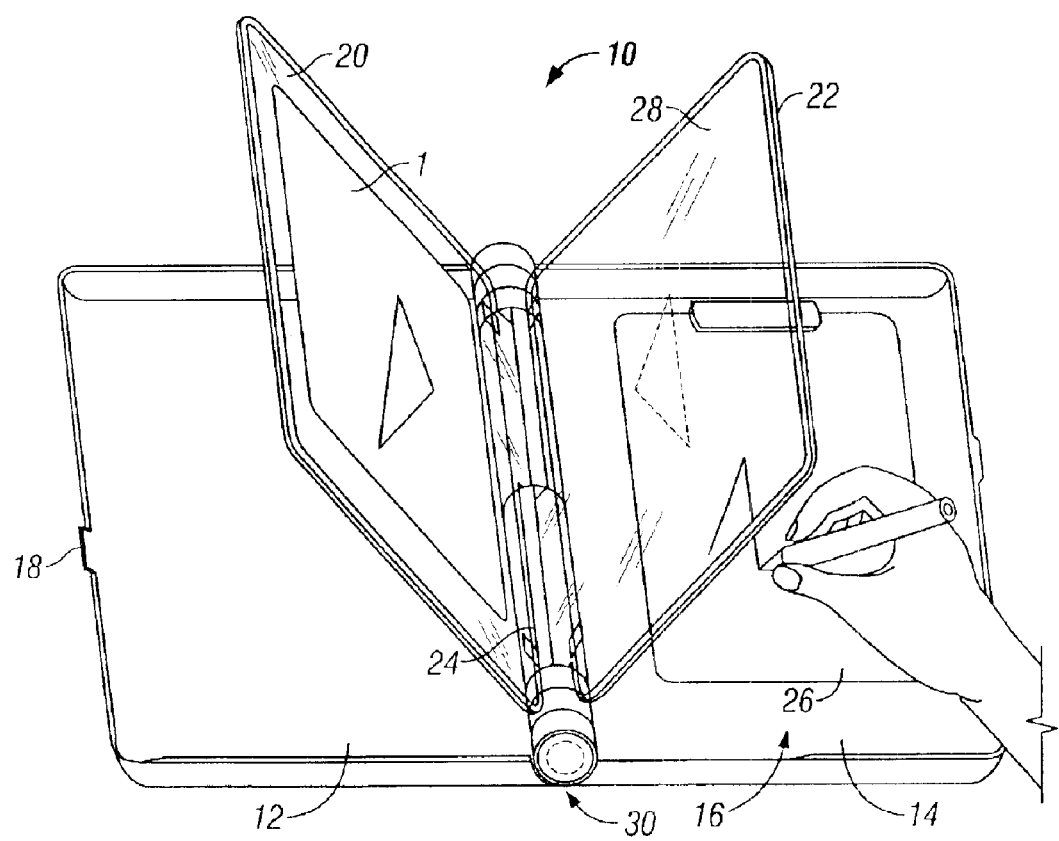
FIG. 2 is a perspective view of a preferred embodiment of the transferring device of the present invention with the support and reflective plates in open position illustrating usage thereof.

As shown in FIGS. 1 and 2, the image transferring device 10 of the present invention has a book form. In FIG. 1, the book is shown in a closed position and in FIG. 2, it is shown in an open position. As best shown in FIG. 2, the image transferring device 10 includes a front cover 12 and a back cover 14. When the image transferring device 10 is in an open position, the front and back covers, 12 and 14, are preferably coplanar and form a base 16. The front and back covers 12, 14 are pivotably connected such that the covers are rotatably movable toward each other to close the book and away from each other to open the book. In a preferred embodiment of the invention, the front and back covers 12, 14 include mating interlocking members 18 along their periphery. The interlocking member 18 on the front cover 12 engages the interlocking member 18 on the back cover 14 to lock the front and back covers 12, 14 together when the image transferring device is closed. The interlocking members 18 can have a detent mechanism or any other known interlocking mechanism.

To facilitate the transfer of an image, the image transferring device 10 includes a support plate 20 and a reflective plate 22 rotatably mounted about a plate holder assembly 30. When the device 10 is closed, the support plate 20 and reflective plate 22 are conveniently stored within the front and back covers 12, 14. To transfer an image, the original image 1 is positioned on the surface of the support plate 20. In a preferred embodiment of the invention, the support plate 20 includes clips 24 for holding the original image 1 in place. The clips 24 are preferably positioned proximal the plate holder assembly 30 to counteract the force of gravity on the original image.

An image receiving surface 26 is provided on the base 16 for tracing the transferred image thereon. The image is transferred from the original image 1 positioned on the support plate 20 onto the reflective plate 22. The reflective plate 22 is preferably transparent and functions as a half-mirror optical element adapted to reflect the transferred image thereon from the support plate 20. After the image has been transferred to the reflective plate 22, a person can look at the image reflected on the first surface 29 of the reflective plate 22 and simultaneously trace the image on the receiving surface 26. It will be apparent that the pattern traced on the receiving surface 26 is the reverse of the pattern on the original image 1.

Figure 3:
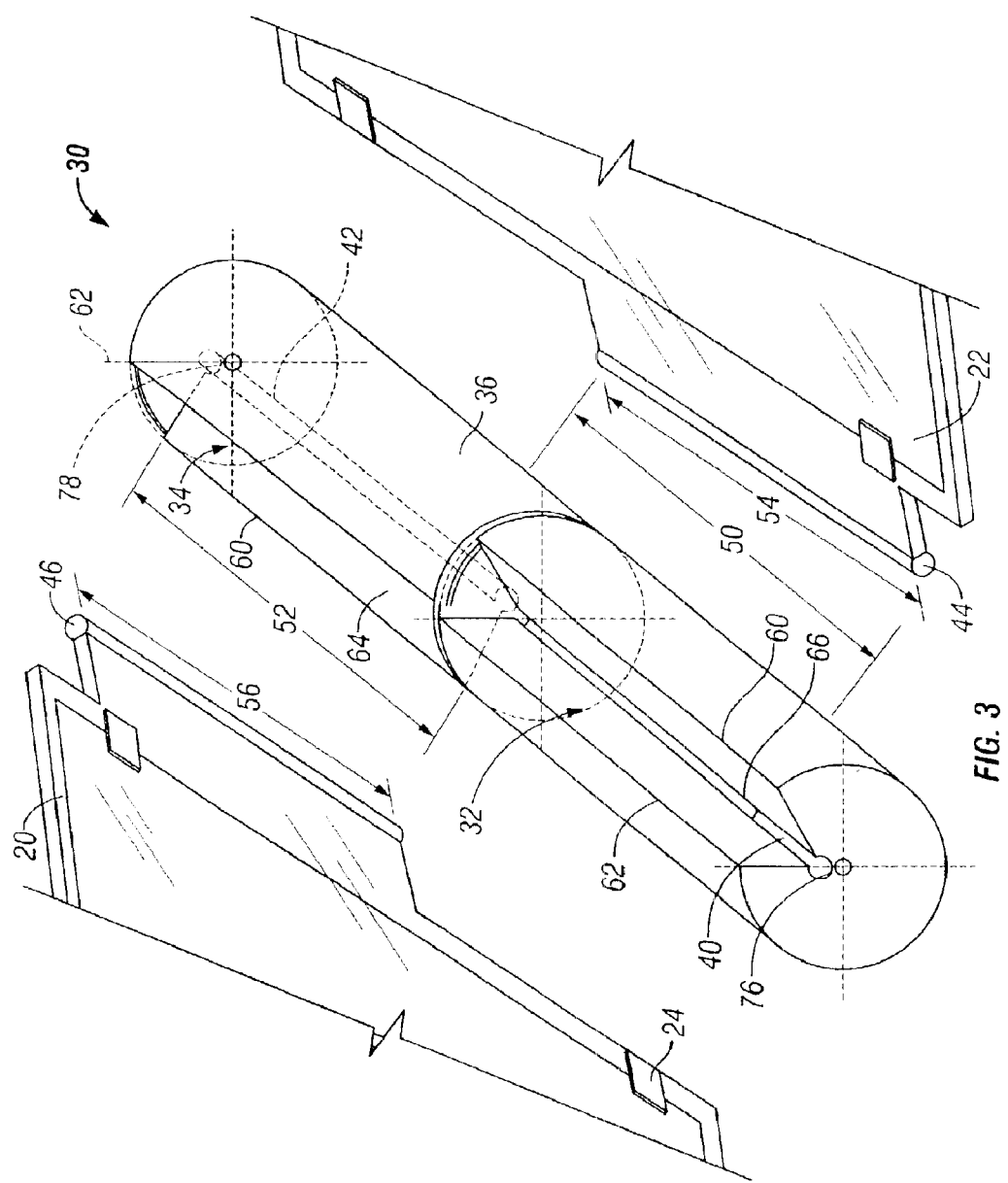
FIG. 3 is a perspective view of the hinge connection portion of a preferred embodiment of the transferring device of the present invention.
Figure 4:
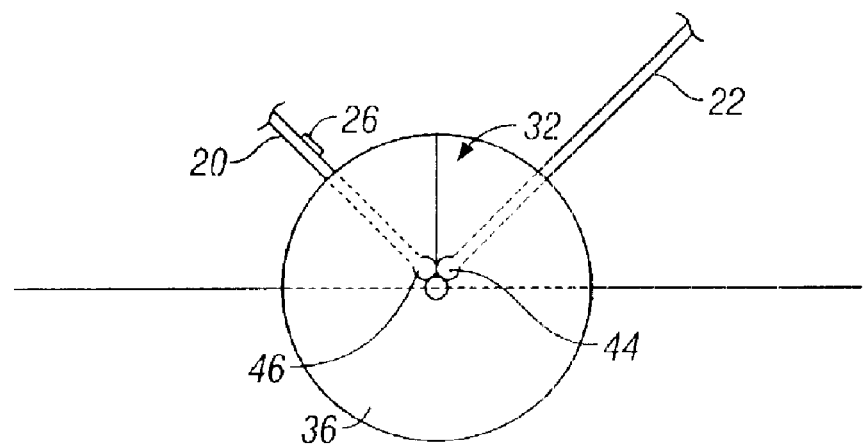
FIG. 4 is an end view of the hinge connection portion of FIG. 3.

As best shown in FIGS. 2 through 4, the plate holder assembly 30 positions the support plate 20 and the reflective plate 22 at the appropriate angles for reflection of the image from the support plate 20 onto the reflective plate 22. When the image transferring device is not in use, the plate holder assembly 30 allows the support plate and reflective plate 22 to rotate with respect to the plate holder assembly 30 into a folded configuration for convenient storage of the image transferring device.

In a preferred embodiment of the invention, the plate holder assembly includes a first plate holder 32, a second plate holder 34, and a cylindrical core member 36. The first and second plate holders 32, 34 are preferably V-shaped cut-outs in the cylindrical core member 36. The first plate holder 32 defines a first receiving channel 40 therein dimensioned to receive the spine 44 of the reflective plate 22. The second plate holder 34 defines a second plate receiving channel 42 therein dimensioned to receive the spine 46 of the support plate 20. The support plate 20 and the reflective plate 22 engage the plate holder assembly 30 by positioning the reflective plate spine 44 in the first plate receiving channel 40 and positioning the support plate spine 46 in the second plate receiving channel 42.

In a preferred embodiment of the invention, the plate receiving channels 40, 42 have an arcuate shape that corresponds to an arcuate shape of the plate spines 44, 46. When the plate spines 44, 46 are positioned in the respective plate receiving channels 40, 42 the curved shape of the plate spines 44, 46 enables the plate spines 44, 46 to rotate within the respective plate receiving channels 40, 42.

The first and second plate holders 32, 34 each have an image reflecting position 60 and a storage end 62. In operation, in order to transfer an image from the support plate 20 onto the reflective plate 22, the support plate 20 is rotated to the image transferring end 60 of the second plate holder 34 and the reflective plate 22 is positioned at the image reflecting position 60 of the first plate holder 32. The first limiting surface 64 of the second plate holder 34 prevents the support plate 20 from rotating any further away from the reflective plate. Similarly, the second limiting surface 66 of the first plate holder 32 prevents the reflective plate 22 from rotating further apart from the support plate. When the reflective plate 22 and support plate 20 are positioned at the image reflecting position 60 of the first and second plate holders 32, 34, respectively, the plates are at the optimum angle for reflecting an image. The image transferring device 10 is configured such that upon opening the device, the support plate 20 automatically rotates, by force of gravity, until it contacts the first limiting surface 64 and the reflective plate 22 automatically rotates until it contacts the second limiting surface 66. Accordingly, upon opening the device, the support plate and the reflective plate will automatically move to be in a position for optimal reflection of an image.

Figure 5:
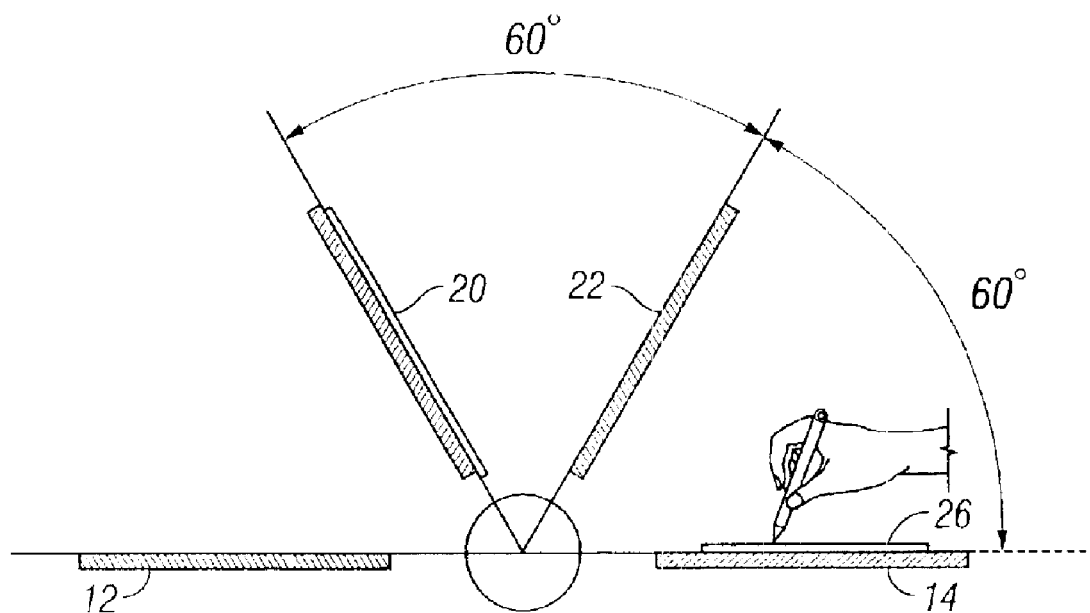
FIG. 5 is a schematic view illustrating the angular relationship between the support plate and the reflective plate when the transferring device of the present invention is in use.

FIG. 5 depicts a schematic view of the angular relationship between the support plate 20, reflective plate 22, and the front and back covers 12, 14. In a preferred embodiment of the invention, when the image transferring device is in use, the angle between the support plate 20 and reflective plate 22 is about 60 degrees. Furthermore, the support plate 20 is positioned at the image reflecting position 60 of the second plate holder 34 such that it is about 60 degrees from the front cover 12. Similarly, the reflective plate 22 is positioned at the image reflecting position 60 of the first plate holder 32 such that it is about 60 degrees from the back cover 12.

For smooth operation of the image transferring device 10, in a preferred embodiment of the invention, as best shown in FIGS. 3 and 4, the plate receiving channels 40, 42 are coaxial. The length 50 of the first plate holder 32 preferably corresponds to the length 54 of the reflective plate spine 44 and the length 52 of the second plate holder 34 preferably corresponds to the length 56 of the support plate spine 46. The support plate spine 46 is preferably less than half the length of the support plate 20 and the reflective plate spine 44 is preferably less than half the length of the reflective plate 22.

To prevent the spines 44, 46 from interfering with the rotation of the plates 20, 22, the spines are preferably offset from each other. In a preferred embodiment of the invention, as best shown in FIG. 3, the reflective plate spine 44 is positioned in the lower half of the reflective plate 22 and the support plate spine 46 is positioned in the upper half of the support plate 20. The spines 44, 46 are preferably bulbous and the first and second plate receiving channels 40, 42 preferably have a corresponding bulbous shape. In a preferred embodiment of the invention, the reflective plate spine 44 can be pressed into engagement with the first plate receiving channel 40 and the support plate spine 46 can be pressed into engagement with the second plate receiving channel 42. The front and back covers 12, 14, the supporting and reflective plates 20, 22 and the plate holder assembly 30 are preferably made of a hard resin.

When the image transferring device 10 is not in use, the device is preferably stored in a folded configuration, as shown in FIG. 1. To fold the image transferring device 10, the support plate 20 is rotated toward the storage position 62 of the second plate holder 34 and the reflective plate 22 is rotated toward the storage position 62 of the first plate holder 32. The front and back covers 12, 14 are rotated toward each other to close the image transferring device. The interlocking members 18 are preferably engaged to lock the device in a book form. In accordance with the principles of the present invention, the support plate 20 and reflective plate 22 are able to fold directly against the front and back covers 12, 14 enabling the transferring device to quickly transform into a compact configuration when the device is not in use, without requiring disassembly of any components of the device.

The embodiments described above are exemplary embodiments of an image transferring device. Those skilled in the art may now make numerous uses of, and departures from, the above-described embodiments without departing from the inventive concepts disclosed herein. Accordingly, the present invention is to be defined solely by the scope of the following claims.

What is claimed is:

1. An image transferring device, comprising:
   a support plate having a spine;
   a reflective plate having a spine;
   a core member adapted to support the support plate and the reflective plate, the core member having a first plate holder and a second plate holder, the first plate holder having a first receiving channel dimensioned to receive the reflective plate spine and the second plate holder having a second receiving channel dimensioned to receive the support plate spine, wherein the reflective plate spine is rotatable within the first receiving channel and the support plate spine is rotatable within the second receiving channel.

2. The image transferring device of claim 1 wherein the support plate spine and reflective plate spine have an arcuate shape.

3. The image transferring device of claim 1 wherein the first and second plate holders are V-shaped cut out portions defined by the core member.

4. The image transferring device of claim 1 wherein the first and second plate holders each have a first end, wherein when the support plate is positioned at the first end of the second plate holder and the reflective plate is positioned at the first end of the first plate holder, the support plate and reflective plate are approximately 60 degrees apart.

5. The image transferring device of claim 1 wherein the first and second plate holders each have a limiting surface that limits the rotation of the reflective plate and support plate, respectively.

6. The image transferring device of claim 5, wherein the reflective plate automatically moves toward and contacts the limiting surface of the first plate holder and the support plate automatically moves toward and contacts the limiting surface of the second plate holder.

7. An image transferring device, comprising:
   a front cover;
   a back cover pivotably attached to the front cover;
   a plate holder assembly positioned between the front and back covers, the plate holder assembly, comprising:
   a) a support plate holder having a channel therein;
   b) a reflective plate holder having a channel therein;
   a support plate rotatable within the channel of the support plate holder; and
   a reflective plate rotatable within the channel of the reflective plate holder.

8. The image transferring device of claim 7 wherein the support plate holder and reflective plate holder each have a limiting surface, and wherein in an operating configuration, the support plate abuts the limiting surface of the support plate holder and the reflective plate abuts the limiting surface of the reflective plate holder.

9. The image transferring device of claim 8 wherein, in the operating configuration, the support plate automatically moves toward the limiting surface of the support plate holder and the reflective plate automatically moves toward the limiting surface of the reflective plate holder.

10. The image transferring device of claim 8 wherein in the operating configuration, the support plate and reflective plate are positioned about 60 degrees apart from each other.

11. The image transferring device of claim 7 wherein the support plate has a spine rotatable within the channel of the support plate holder and the reflective plate has a spine rotatable within the channel of the reflective plate holder.

12. The image transferring device of claim 11 wherein the spines of the support plate and reflective plate are offset.

13. The image transferring device of claim 11 wherein the spines of the support plate and reflective plate are bulbous and the first and second plate receiving channels have a corresponding bulbous shape.

14. An image transferring device, comprising:
   a support plate having a bulbous spine;
   a reflective plate having a bulbous spine, wherein the reflective plate spine is offset from the support plate spine;
   a core member adapted to support the support plate and the reflective plate, the core member having:
   a) a first plate holder having a first receiving channel dimensioned to receive the reflective plate spine and allow rotation of the reflective plate spine between a first end and a second end;
   b) a second plate holder having a second receiving channel dimensioned to receive the support plate spine and allow rotation of the support plate spine between a first end and a second end;
   an operating configuration wherein the reflective plate and the support plate are positioned at the first end of the first and second plate holders, respectively; and
   a folded configuration wherein the reflective plate and the support plate are positioned at the second end of the first and second plate holders, respectively.

15. The image transferring device of claim 14 wherein in the operating configuration the reflective plate automatically moves to the first end of the first plate holder and the support plate automatically moves to the first end of the second plate holder.

16. The image transferring device of claim 14 wherein in the operating configuration, the support plate and reflective plate are approximately 60 degrees apart.

17. The image transferring device of claim 14 further comprising a front cover and a back cover, wherein in the operating configuration the front and back cover are coplanar and in the folded configuration, the front and back covers are substantially parallel.

18. An image transferring device for enabling the drawing of an image on a sheet based on an original image on an original sheet, comprising:

a support plate to support the original sheet;

a reflective plate;

an axial core member connected to the support plate and the reflective plate;

the support plate and the reflective plate angularly rotatable about the axial core member such that the two plates can be rotated to an operative position and to a closed position where the two plates lie upon each other, wherein the improvement comprises:

the axial core member has an operative position stop member and a closed position stop member for each plate such that each plate's angular rotation about the axial core member is restricted between the two stop members.

* * * * *